UNITED STATES PATENT OFFICE.

THOMAS M. RECTOR, OF BALTIMORE, MARYLAND, ASSIGNOR TO MUSHER & COMPANY, INCORPORATED, OF NEW YORK, N. Y., A CORPORATION OF DELAWARE.

METHOD OF PRODUCING TRANSPARENT EMULSION.

1,389,161. Specification of Letters Patent. Patented Aug. 30, 1921.

No Drawing. Application filed November 11, 1919, Serial No. 337,288. Renewed July 23, 1921. Serial No. 487,128.

*To all whom it may concern:*

Be it known that I, THOMAS M. RECTOR, a citizen of the United States of America, residing at Baltimore, in the county of Baltimore City and State of Maryland, have invented certain new and useful Improvements in Methods of Producing Transparent Emulsion, of which the following is a specification.

The present invention has particular reference to the method of producing a transparent or translucent emulsion and consists in treating two or more immiscible substances as an oleaginous substance and an aqueous fluid to bring their refractive indices to the same point before mixing whereby when said immiscible substances are emulsified, a transparent or translucent solution will result, the degree of transparency being controlled by the similarity of the refractive indices of the different materials.

The present invention is to be considered in its broadest scope and while there is hereinafter set forth an example in which an emulsion is rendered transparent, it is to be understood that the invention contemplates the emulsification of any number of immiscible substances having normally different refractive indices for purposes of producing a translucent emulsion.

As an example, two common immiscible substances are water and oil. After the usual emulsification of water and oil is obtained, the resultant emulsion is of opaque nature, and as an illustration, the medicine now carried as Scott's Cod Liver Emulsion is a thick white creamy substance including therein oil of the cod fish liver and water with the emulsifying agents, thus producing a substance that is opaque.

The present improved process consists in treating one of the substances whereby the oil and water have similar refractive indices. This step in the process may be accomplished by adding salt, sugar or other water soluble material to the water to obtain a thorough mixture thereof, after which the oil and treated water is mixed in the presence of an emulsifying agent to produce a transparent or translucent emulsion wherein the degree of transparency is controlled by the similarity between the refractive indices of the different substances, as, where there is slight variance in the refractive indices of the two immiscible substances, the emulsion will be more translucent than transparent.

The above method may be employed with any number of immiscible substances, the idea being to transform the substances by the addition thereto of material soluble therein for bringing the refractive indices of the different substances to the same point whereby the different materials when emulsified with the addition of any ordinary emulsifying agent produce a transparent or translucent solution.

What is claimed as new is:—

1. The method of producing a transparent emulsion consisting in adding to one or more of the substances to be emulsified, such products soluble therein as will render the refractive indices of the substances identical and then emulsifying the same.

2. The method of rendering an emulsion transparent or translucent consisting in adding a substance to an aqueous fluid to bring the refractive index thereof to the same refractive index of an oleaginous substance and mixing the oleaginous substance and aqueous solution in the presence of an emulsifying agent.

In testimony whereof I affix my signature.

THOMAS M. RECTOR.